April 16, 1940. L. E. MOHLER 2,197,702
VEHICLE DIRECTION SIGNAL MERCURY SWITCH
Filed June 23, 1939
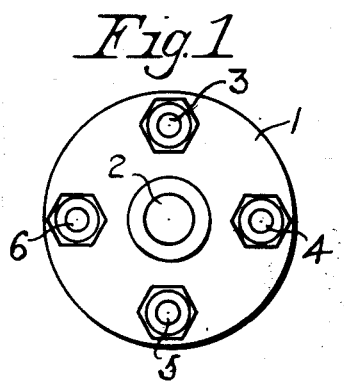
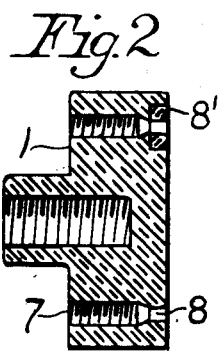
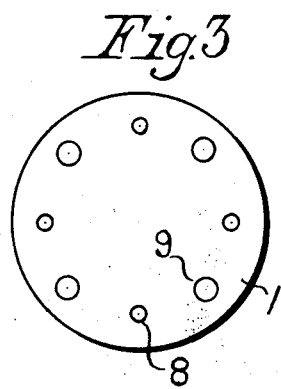
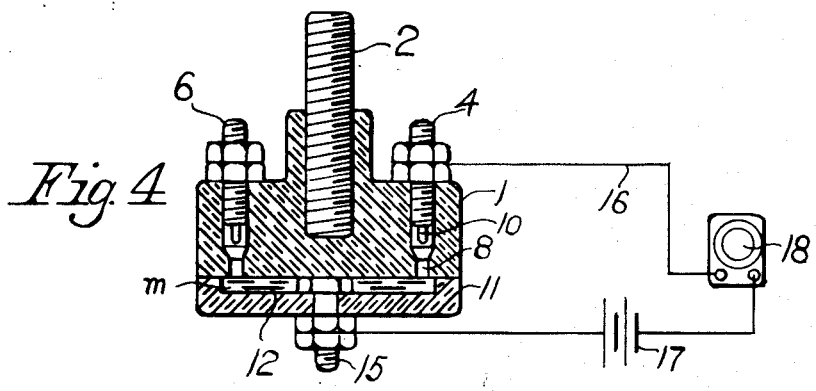
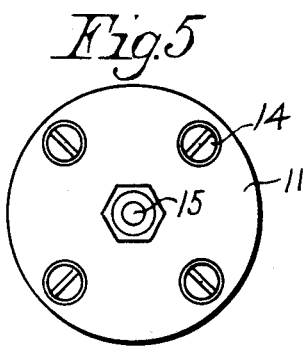
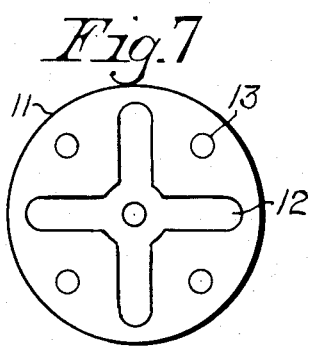
Inventor
Lawrence Ellis Mohler,
By Edwin Guthrie
Attorney Patented Apr. 16, 1940

2,197,702

UNITED STATES PATENT OFFICE 2,197,702

VEHICLE DIRECTION SIGNAL MERCURY SWITCH

Lawrence Ellis Mohler, Wayne, Mich.

Application June 23, 1939, Serial No. 280,864

3 Claims. (Cl. 200—152)

This invention relates to vehicle direction signal mercury switches. The purpose of the invention is to provide reliable means of indicating right and left hand turns of an automobile independently of the action of the driver. The indicators, not shown and forming no part of the invention, may be special electric lamps, or a combination of two or more separate lamps on the rear of the vehicle. The switch will be located as far as practicable forward on the automobile in order that any turning movement or stopping or starting action will cause a prompt response by the switch.

The invention consists of the special construction and arrangement of parts illustrated in the accompanying drawing, of which Fig. 1 represents a top view.

Fig. 2 is a sectional view of the upper portion of the switch.

Fig. 3 is a bottom view of the upper portion shown in the Fig. 2.

Fig. 4 is a vertical sectional view of all parts assembled and showing the relative positions of the parts.

Fig. 5 is a bottom view of the lower portion of the switch.

Fig. 6 is a sectional view of the lower portion.

Fig. 7 is a view of the cavities or dished surface of the lower portion of the switch which is placed against the upper portion in assembling the invention.

Throughout the drawing and description the same number is used to refer to the same part.

The top or upper portion 1 may be entirely of insulating material, or partially of another substance, and it is provided with a threaded stem 2 by which the switch can be attached to any desired support on the forward part of the automobile. As shown in Fig. 1 there are usually four contact bolts 3, 4, 5 and 6, and each of these bolts is held in a bore such as the bore 7 in Fig. 2 threaded for engagement with the bolt and extending through the upper portion 1. It will be noted that the end of each bore 7 is formed into a duct 8 of somewhat less diameter than the main portion of the bore. Screwholes 9 are formed in the bottom of the upper portion 1 to receive the screws which secure the lower and upper portions of the switch together. The contact bolts occupy the bores as illustrated, and each bolt is provided with a contact point 10, such as set out in Fig. 4 for the bolt 4, and the contact point terminates the bolt at an adjustable distance above the lower portion when attached to the upper portion.

The lower portion 11 of the switch has a cross-shaped dished cavity 12 as shown in Fig. 7. This invention is not limited to the exact shape of the cavity or to the size thereof. Through the lower portion 11 are screwholes 13 passing the screws 14 with countersunk heads as shown in Fig. 5, and which engage the like screwholes 9 in the upper portion. A contact bolt 15 projects through the lower portion of the switch, and may be connected with the conductors 16 forming an electric circuit 17 and including any signal 18.

In operation, if the contact bolts in the upper portion are at right angles, and the switch properly placed on the auto., a sudden turn to left will by inertia cause the mercury to enter duct 8 and contact with the point 10 of bolt 4, thus completing the signal circuit. An opposite turn of the vehicle will have an opposite result and light another signal indicating a different direction. A start forward of the car will cause the mercury m to enter into contact with the conducting bolt 5, and a backing movement will place bolt 3 in circuit. It is practicable with this invention in making, for example, a forward movement and a sidewise turning at the same time to give signal notice of both movements. The number of contact members may be increased or decreased if so desired. No limitation is intended as to the material of which the upper and lower portions of the body of the invention are composed, and it is advantageous in assembling the body portions to expel all the air to prevent oxidizing. It is a distinct and valuable aid to the operating life of this invention, to place glass beads such as 8' and as shown in Fig. 2 to guard the inlets to the contact bolts. The glass beads act to keep the inlets free and clear for the entrance of the mercury.

Having now described this invention, I claim:

1. In a mercury switch of the character described, upper and lower portions constructed of insulating material, the upper portion provided with means for connecting the switch with a support and having spaced threaded bores extending through it, metal bolts adjustable in said bores and adapted to be exteriorly connected with electrical conductors, said lower portion of the switch provided with a contact bolt and being dished to contain mercury and constructed to be attached to the said upper portion, and the said bolts in the upper portion being arranged to terminate in the said bores above the lower portion whereby displacement of the mercury will cause same to enter a bore and contact with a bolt.

2. In a mercury switch of the character described, upper and lower portions constructed of insulating material, the upper portion provided with means for connecting the switch with a support and having spaced threaded bores, said bores extending through said upper portion and having metal bolts adjustable in the bores and adapted to be exteriorly connected with electrical conductors, said lower portion of the switch being provided with a contact bolt and constructed to be attached to said upper portion, said lower portion having channels centrally connected with each other and arranged to form communication with the bores of the said upper portion, and the said bolts in the upper portion being arranged to terminate above the attached lower portion whereby displacement of the mercury will cause same to enter a bore and contact with a bolt.

3. In a mercury switch of the character described, an upper portion constructed of insulating material, a lower portion adapted to be attached to the upper portion, the upper portion being provided with means for connecting the switch with a support and having spaced threaded bores extending through said upper portion, metal bolts adjustable in the said bores and adapted to be exteriorly connected with electrical conductors, the said lower portion being constructed and arranged for connection with electrical conductors, said lower portion having dished surface cavities arranged in communication with the said bores of the upper portion, and the said bolts in the upper portion being arranged to terminate above the attached lower portion whereby displacement of the mercury will cause the same to enter a bore and contact with a bolt therein.

LAWRENCE ELLIS MOHLER.